(12) United States Patent
Huo et al.

(10) Patent No.: US 10,147,572 B2
(45) Date of Patent: Dec. 4, 2018

(54) EMBEDDED POLE AND METHOD OF ASSEMBLING SAME

(71) Applicant: ABB Schweiz AG, Baden (CH)

(72) Inventors: Bin Huo, Shanghai (CN); Wenhua Que, Shanghai (CN); Xuewei Sun, Shanghai (CN); Lijuan Kong, Shanghai (CN); Xian Yang, Shanghai (CN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/437,945

(22) Filed: Feb. 21, 2017

(65) Prior Publication Data

US 2017/0263401 A1   Sep. 14, 2017

(30) Foreign Application Priority Data

Mar. 11, 2016  (CN) .......................... 2016 1 0138305

(51) Int. Cl.
| | |
|---|---|
| H01H 33/66 | (2006.01) |
| G01D 5/00 | (2006.01) |
| H01H 11/04 | (2006.01) |
| H01H 11/00 | (2006.01) |
| H01H 33/666 | (2006.01) |

(52) U.S. Cl.
CPC ........... *H01H 33/6606* (2013.01); *G01D 5/00* (2013.01); *H01H 11/0062* (2013.01); *H01H 11/04* (2013.01); *H01H 33/666* (2013.01); *H01H 2300/052* (2013.01)

(58) Field of Classification Search
CPC ... H01H 11/04; H01H 33/6606; H01H 71/125
See application file for complete search history.

(56) References Cited

U.S. PATENT DOCUMENTS

| | | |
|---|---|---|
| 3,641,359 A | 2/1972 | McCarty |
| 3,925,722 A | 12/1975 | Fohrhaltz et al. |
| 3,953,698 A | 4/1976 | Luttgert et al. |
| (Continued) | | |

FOREIGN PATENT DOCUMENTS

| | | |
|---|---|---|
| CA | 983113 A | 2/1976 |
| CA | 1 245 696 A | 11/1988 |
| (Continued) | | |

OTHER PUBLICATIONS

Long, G., "Study on On-line Monitoring of Mechanic Characteristics for Vacm Breaker," Sensors & Transdcers, vol. 182, Issue 11, pp. 256-262 (Nov. 2014).

(Continued)

*Primary Examiner* — Truc Nguyen
(74) *Attorney, Agent, or Firm* — Barnes & Thornburg LLP

(57) ABSTRACT

An embedded pole is provided which includes a conductive path and a movable contact. The movable contact is selectively movable between a first position in which the conductive path is closed and a second position in which the conductive path is open. An insulation element is coupled to and selectively movable in conjunction with the movable contact. The embedded pole further includes a sensor coupled to the insulation element and operable to detect a displacement of the insulation element that corresponds to a movement of the movable contact between the first position and the second position.

12 Claims, 3 Drawing Sheets

(56) References Cited

U.S. PATENT DOCUMENTS

| | | | |
|---|---|---|---|
| 4,007,345 A | 2/1977 | Kohler et al. | |
| 4,146,766 A | 3/1979 | Forrester et al. | |
| 4,227,059 A | 10/1980 | Ogawa | |
| 4,780,786 A | 10/1988 | Weynachter et al. | |
| 6,002,560 A | 12/1999 | Nguyen et al. | |
| 6,150,625 A | 11/2000 | Marchand et al. | |
| 6,231,227 B1 | 5/2001 | Andersen | |
| 6,331,687 B1* | 12/2001 | Dunk | H01H 11/0062 218/140 |
| 6,361,205 B2 | 3/2002 | Andersen | |
| 6,442,011 B1* | 8/2002 | Attarian | G01R 15/202 324/117 H |
| 7,038,201 B2 | 5/2006 | Nichols | |
| 7,098,418 B1 | 8/2006 | Yamada et al. | |
| 7,405,569 B2 | 7/2008 | Hagel et al. | |
| 7,906,742 B2 | 3/2011 | Steffens et al. | |
| 8,264,232 B2 | 9/2012 | Rival | |
| 8,487,201 B2 | 7/2013 | Jansson et al. | |
| 8,835,790 B2 | 9/2014 | Kantas | |
| 8,952,826 B2* | 2/2015 | Leccia | G01R 31/3274 340/652 |
| 2005/0178647 A1 | 8/2005 | Nichols | |
| 2008/0093202 A1 | 4/2008 | Di Centa | |
| 2012/0253695 A1 | 10/2012 | Schrag et al. | |
| 2015/0114807 A1* | 4/2015 | Benke | H02B 11/167 200/50.23 |
| 2016/0141136 A1* | 5/2016 | Ashtekar | H01H 71/10 200/50.01 |
| 2017/0047181 A1* | 2/2017 | Yang | G01R 31/3277 |

FOREIGN PATENT DOCUMENTS

| | | |
|---|---|---|
| CN | 1828320 A | 9/2006 |
| CN | 100401080 C | 7/2008 |
| CN | 101261192 A | 9/2008 |
| CN | 201522959 U | 7/2010 |
| CN | 101469971 B | 11/2010 |
| CN | 102074408 A | 5/2011 |
| CN | 201985579 U | 9/2011 |
| CN | 202066680 U | 12/2011 |
| CN | 202172265 U | 3/2012 |
| CN | 102522269 A | 6/2012 |
| CN | 202405192 U | 8/2012 |
| CN | 202501873 U | 10/2012 |
| CN | 1976147 B | 11/2012 |
| CN | 102879735 A | 1/2013 |
| CN | 102901622 A | 1/2013 |
| CN | 202651004 U | 1/2013 |
| CN | 103018666 * | 4/2013 |
| CN | 202870258 U | 4/2013 |
| CN | 202905574 U | 4/2013 |
| CN | 103346483 A | 10/2013 |
| CN | 103377860 A | 10/2013 |
| CN | 103439093 A | 12/2013 |
| CN | 103439094 A | 12/2013 |
| CN | 203350410 U | 12/2013 |
| CN | 203434447 U | 2/2014 |
| CN | 103633618 A | 3/2014 |
| CN | 103675669 A | 3/2014 |
| CN | 103681091 A | 3/2014 |
| CN | 203479502 U | 3/2014 |
| CN | 203479503 U | 3/2014 |
| CN | 103698698 A | 4/2014 |
| CN | 101894692 B | 5/2014 |
| CN | 203659745 U | 6/2014 |
| CN | 203674062 U | 6/2014 |
| DE | 26 40 921 A1 | 3/1978 |
| DE | 29 02 489 A1 | 7/1980 |
| DE | 205 027 A1 | 12/1983 |
| DE | 33 32 500 A1 | 3/1985 |
| DE | 197 09 089 A1 | 9/1998 |
| DE | 10 2004 020 045 A1 | 11/2005 |
| EP | 0 258 090 B1 | 3/1992 |
| EP | 0 883 146 B2 | 8/2011 |
| EP | 2 328 159 B1 | 1/2012 |
| FR | 2 346 837 A1 | 10/1977 |
| GB | 1 442 479 A | 7/1976 |
| GB | 1 494 755 A | 12/1977 |
| GB | 1499106 A | 1/1978 |
| IN | 200702143 I1 | 1/2008 |
| IN | 201000832 I4 | 7/2011 |
| IN | 201204638 P4 | 4/2013 |
| IT | 1072711 B | 4/1985 |
| JP | H05-225323 A | 9/1993 |
| JP | H10-255609 A | 9/1998 |
| JP | 2002-343173 A | 11/2002 |
| JP | 2006-310133 A | 11/2006 |
| JP | 3881789 B2 | 2/2007 |
| JP | 4682046 B2 | 5/2011 |
| JP | 4721882 B2 | 7/2011 |
| JP | 4816491 B2 | 11/2011 |
| JP | 5225323 B2 | 7/2013 |
| RU | 2012 126 118 A | 12/2013 |
| SU | 987703 A1 | 1/1983 |
| WO | 2005/104155 A1 | 11/2005 |
| WO | 2008/000105 A1 | 1/2008 |
| WO | 2012/072810 A1 | 6/2012 |
| WO | 2014/055188 A1 | 4/2014 |

OTHER PUBLICATIONS

Poltl, A., et al., "Field Experiences with HV Circuit Breaker Condition Monitoring," ABB, pp. 1-10 (Jun. 2011).

Song, M., et al., "Online Monitoring System Design of Intelligent Circuit Breaker Based on DSP and ARM," International Journal of Advanced Computer Science and Applications, vol. 5, Issue 8, pp. 93-96 (2014).

* cited by examiner

EMBEDDED POLE AND METHOD OF ASSEMBLING SAME

CROSS-REFERENCE TO RELATED APPLICATION

This application claims priority to Chinese Patent Application No. 201610138305.8, filed Mar. 11, 2016.

BACKGROUND

The field of the invention relates generally to embedded poles for use in switching devices, and more particularly, to embedded poles including sensors for determining characteristics of the embedded poles.

Typically, embedded poles are implemented in a switching device, such as a medium voltage circuit breaker. At least some known embedded poles include contacts that are separated to open a circuit of the switching device when an overcurrent event occurs. Characteristics of the embedded poles, such as opening speed, closing speed, distance between contacts, and the condition of the contacts, affect the performance of the switching device. However, the embedded poles experience wear and deterioration during operation of the switching device. For example, during overcurrent events, an arc extends between the contacts and causes wear to the contacts. This wear and deterioration affects the performance of the switching device. Therefore, a user must determine the condition of the embedded poles to accurately determine the performance capabilities of the switching device. However, the conditions of the embedded poles continuously change during operation of the switching device. Moreover, at least some components of the embedded poles, such as the contacts, are at least partially enclosed in a vacuum interrupter inhibiting the user's ability to monitor the components. Accordingly, there is a need for devices to monitor the condition of embedded poles in real time.

BRIEF DESCRIPTION

In one aspect, an embedded pole is provided. The embedded pole includes a conductive path and a movable contact. The movable contact is selectively movable between a first position in which the conductive path is closed and a second position in which the conductive path is open. An insulation element is coupled to and selectively movable in conjunction with the movable contact. The embedded pole further includes a sensor coupled to the insulation element and operable to detect a displacement of the insulation element that corresponds to a movement of the movable contact between the first position and the second position.

In another aspect, a sensor for use with an embedded pole is provided. The sensor includes a body and a movable arm. The movable arm is movable relative to the body and contacts an expansion plate coupled to an insulation element of the embedded pole. The movable arm is displaced when the insulation element moves.

In yet another aspect, a method of assembling an embedded pole is provided. The method includes coupling a movable contact to a conductive path that includes an upper terminal and a lower terminal. The movable contact is selectively movable between a first position in which the conductive path is closed and a second position in which the conductive path is open. The method also includes housing at least a portion of the conductive path in an insulation. The upper terminal is disposed in an upper portion of the insulation shell and the lower terminal is disposed in a lower portion of the insulation shell. An insulation element is coupled to the movable contact and moves in conjunction with the movable contact. The method further includes coupling a sensor to the insulation element. The sensor detects displacement of the insulation element.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems including one or more embodiments of the disclosure. As such, the drawings are not meant to include all conventional features known by those of ordinary skill in the art to be required for the practice of the embodiments disclosed herein.

DETAILED DESCRIPTION

The systems and methods described herein provide a sensor to detect displacement of a movable contact of an embedded pole. In some embodiments, the sensor directly measures displacement of an insulation element coupled to the movable contact. As a result, the sensor provides real time monitoring of operation of the embedded pole. For example, the sensor is used to determine characteristics such as the distance between the movable contact and a fixed contact, the opening speed of the embedded pole, the closing speed of the embedded pole, and the degree of wear of the contacts. Further, in some embodiments, the sensor is used to measure characteristics of contacts that are enclosed in a vacuum interrupter of the embedded pole.

Figure 1:
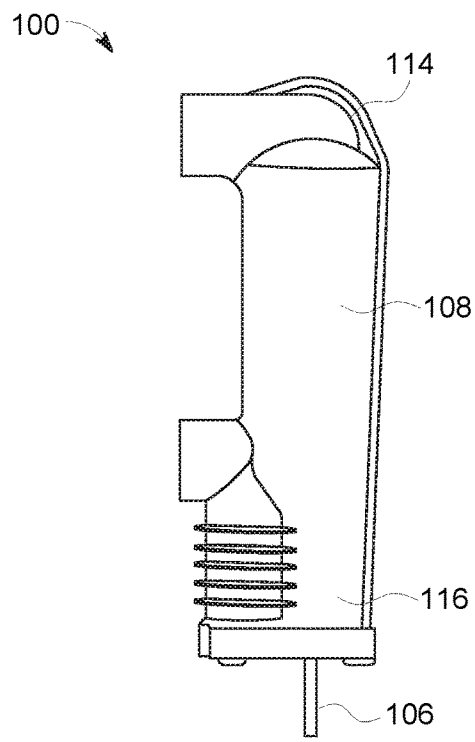
FIG. 1 is a side view of an exemplary embedded pole.
Figure 2:
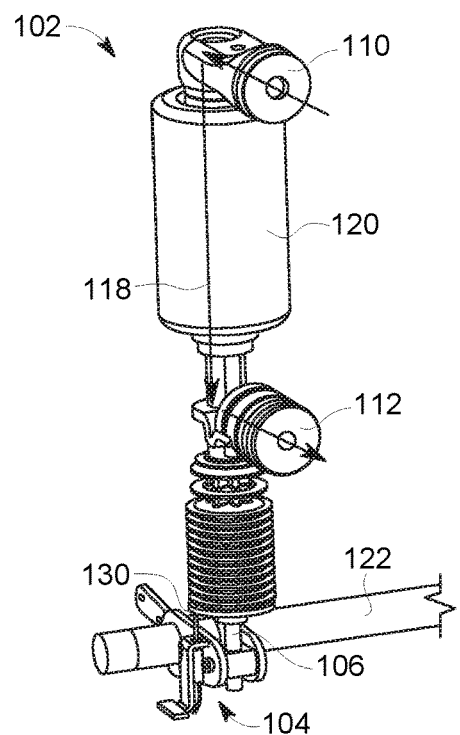
FIG. 2 is a perspective view of the embedded pole shown in FIG. 1 with an insulation shell omitted.
Figure 3:
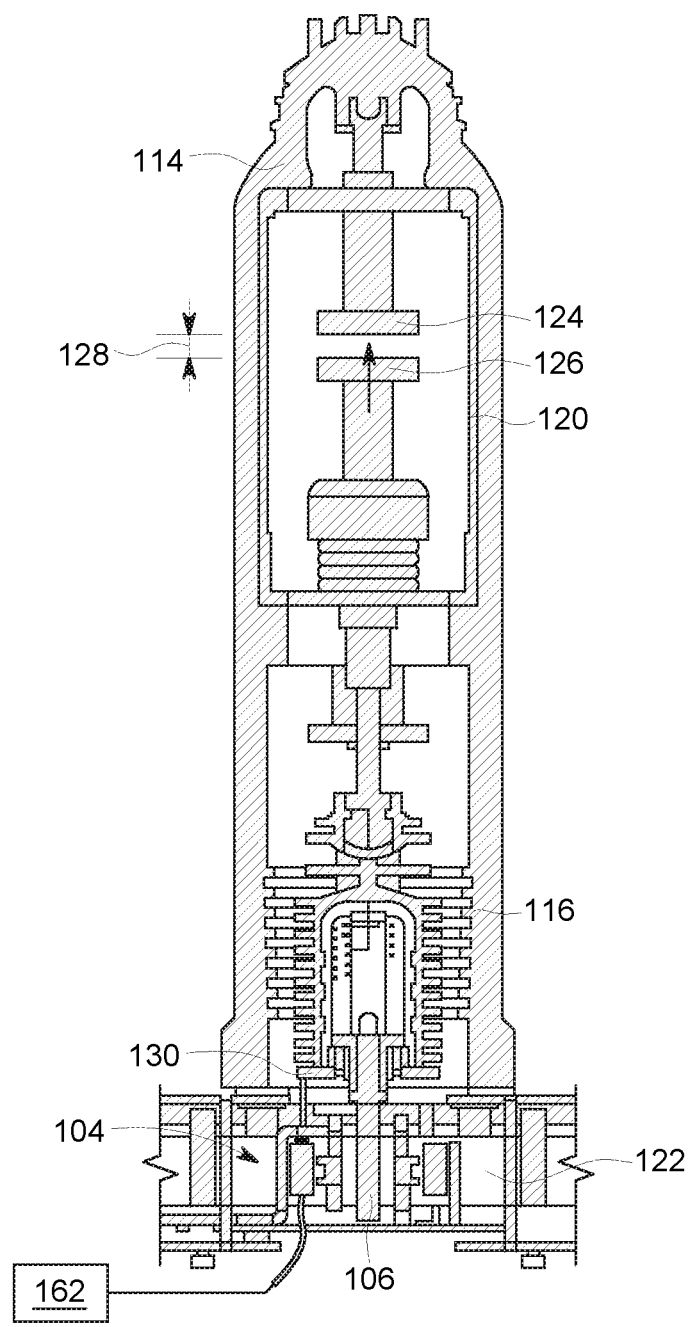
FIG. 3 is a schematic sectional view of the embedded pole shown in FIG. 1.

FIG. 1 is a side view of an exemplary embedded pole 100. FIG. 2 is a perspective view of embedded pole 100. FIG. 3 is a sectional view of embedded pole 100. Embedded pole 100 is disposed, for example, in a medium voltage circuit breaker to provide an electrical connection between two components. Embedded pole 100 includes a conductive path 102, a sensor 104, an insulation element 106, and an insulation shell 108. Insulation element 106 and insulation shell 108 are made of an insulating material. In alternative embodiments, insulation element 106 and insulation shell 108 are made of any materials that enable embedded pole 100 to operate as described herein. In the exemplary embodiment, insulation shell 108 houses at least a portion of conductive path 102 and insulation element 106. For clarity, insulation shell 108 is omitted in FIG. 2.

As shown in FIG. 2, conductive path 102 electrically connects two components (not shown). Specifically, conductive path 102 includes an upper terminal 110 that couples to a first component (not shown), and a lower terminal 112 that couples to a second component (not shown). Insulation shell 108 includes an upper portion 114 and a lower portion 116 integrated together to form a continuous body. Upper terminal 110 is disposed in upper portion 114 and lower terminal 112 is disposed in lower portion 116. Conductive path 102 provides a current path 118 that electrically connects the first and second components when the first component is coupled to upper terminal 110 and the second component is coupled to lower terminal 112. In alternative embodiments, conductive path 102 has any configuration that enables embedded pole 100 to operate as described herein. In the exemplary embodiment, all components of conductive path 102 are copper. In alternative embodiments, components of conductive path 102 are any materials that enable conductive path 102 to function as described herein.

In the exemplary embodiment, current path 118 passes through a vacuum interrupter 120. As shown in FIG. 3, a first end of insulation element 106 is coupled to a movable end of vacuum interrupter 120, and a second end of insulation element 106 is coupled to a mechanical driving system 122. In the illustrated embodiment, insulation element 106 is a rod extending between vacuum interrupter 120 and mechanical driving system 122. In alternative embodiments, insulation element 106 has any configuration that enables embedded pole 100 to operate as described herein.

In the exemplary embodiment, embedded pole 100 further includes a fixed contact 124 and a movable contact 126 disposed at least partially within vacuum interrupter 120. Movable contact 126 is movable between a first position in which movable contact 126 and fixed contact 124 are in contact and a second position in which movable contact 126 and fixed contact 124 are spaced a distance apart. Current flows between first and second components through movable contact 126 and fixed contact 124 when movable contact 126 is in the first position. When movable contact 126 is spaced from fixed contact 124, current is inhibited from flowing between the first and second components. In other words, conductive path 102 is closed when movable contact 126 is in the first position and conductive path 102 is open when movable contact 126 is in the second position.

Movable contact 126 and fixed contact 124 are spaced apart a distance 128 when movable contact 126 is in the second position. In some embodiments, distance 128 is in a range from about 1 millimeters (mm) to about 100 mm. In further embodiments, distance 128 is in a range from about 5 mm to about 20 mm. In the exemplary embodiment, distance 128 is approximately 10 mm. In alternative embodiments, movable contact 126 and fixed contact 124 are spaced apart any distance 128 that enables embedded pole 100 to operate as described herein.

In the exemplary embodiment, insulation element 106 is coupled to movable contact 126 such that insulation element 106 is displaced when movable contact 126 is moved between the first position and the second position. In particular, movable contact 126 and insulation element 106 move in a linear direction. In reference to the orientation shown in FIG. 3, movable contact 126 and insulation element 106 move vertically. In alternative embodiments, movable contact 126 and/or insulation element 106 moves in any manner that enables embedded pole 100 to operate as described herein.

Figure 4:
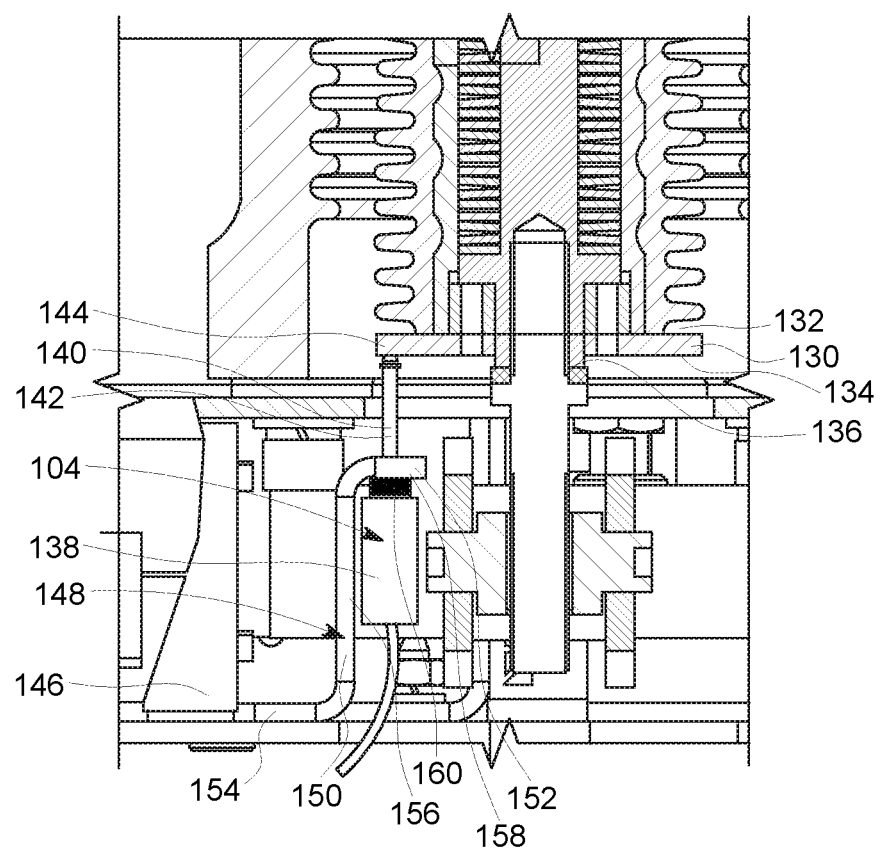
FIG. 4 is an enlarged sectional view of a portion of the embedded pole shown in FIG. 1.

FIG. 4 is an enlarged sectional view of a portion of embedded pole 100. An expansion plate 130 extends adjacent lower portion 116 of insulation shell 108 and moves with insulation element 106. Expansion plate 130 defines a first surface 132 facing vacuum interrupter 120, a second surface 134 opposed to first surface 132, and an opening 136 through first surface 132 and second surface 134. Expansion plate 130 is coupled to insulation element 106 such that insulation element 106 extends through opening 136. In the illustrated embodiment, expansion plate 130 is a circular plate. In alternative embodiments, expansion plate 130 has any configuration that enables embedded pole 100 to operate as described herein. In the exemplary embodiment, expansion plate 130 is made of an insulating material. For example, in some embodiments, expansion plate 130 is at least partially made of epoxy. In alternative embodiments, expansion plate 130 is made of any materials that enable embedded pole 100 to operate as described herein.

In addition, in the exemplary embodiment, sensor 104 includes a body 138 and a movable arm 140 that moves relative to body 138. In particular, movable arm 140 extends vertically from body 138 and moves in the vertical direction in reference to the orientation shown in FIG. 4. Movable arm 140 includes a proximal end 142 coupled to body 138 and a tip 144 contacting expansion plate 130. In particular, tip 144 contacts second surface 134 of expansion plate 130. Movable arm 140 is biased towards expansion plate 130 such that movable arm 140 remains in contact with expansion plate 130 as expansion plate 130 and insulation element 106 are displaced. Accordingly, sensor 104 detects displacement of insulation element 106. In some embodiments, sensor 104 has a resolution in a range from about 0.1 micrometers to about 100 micrometers. In the exemplary embodiment, sensor 104 has a resolution of approximately 10 micrometers. In alternative embodiments, sensor 104 has any configuration that enables embedded pole 100 to operate as described herein.

Moreover, in the exemplary embodiment, sensor 104 is coupled to a frame 146 and is disposed adjacent lower portion 116 of insulation shell 108. Sensor 104 extends on the exterior of insulation shell 108. A support member 148 couples sensor 104 to frame 146. Support member 148 includes an arm 150 having an upper portion 152, a lower portion 154, and a middle portion 156 extending between upper portion 152 and lower portion 154. Upper portion 152 extends substantially horizontally in reference to the orientation shown in FIG. 4 and defines an opening 158. Movable arm 140 extends through opening 158 such that movable arm 140 moves relative to support member 148. A coupling mechanism 160 couples sensor 104 to support member 148 such that body 138 is fixed to support member 148 and movable arm 140 moves relative to support member 148. In alternative embodiments, support member 148 has any configuration that enables embedded pole 100 to operate as described herein.

As shown in FIG. 3, a processor 162 is coupled to sensor 104. Processor 162 is in communication with sensor 104 such that processor 162 sends signals to and/or receives signals from sensor 104. At least some signals relate to displacement of movable arm 140 of sensor 104, which indicates movement of insulation element 106 and movable contact 126. Processor 162 is configured to determine, based on the sensed displacement, at least one of the following characteristics of embedded pole 100: a distance between movable contact 126 and fixed contact 124 when movable contact 126 is in the second position, a speed of movement of movable contact 126 from the first position to the second position, a speed of movement of movable contact 126 from the second position to the first position, and a degree of wear of movable contact 126 and/or fixed contact 124. In alternative embodiments, processor 162 has any configuration that enables embedded pole 100 to operate as described herein.

In reference to FIGS. 1-4, a method of assembling embedded pole 100 includes coupling movable contact 126 to conductive path 102 such that movable contact 126 moves between a first position in which conductive path 102 is closed and a second position in which conductive path 102 is opened. The method also includes housing at least a portion of conductive path 102 in insulation shell 108 such that upper terminal 110 is disposed in upper portion 114 of insulation shell 108 and lower terminal 112 is disposed in lower portion 116 of insulation shell 108. Insulation element 106 is coupled to movable contact 126 such that insulation element 106 moves with movable contact 126. The method further includes coupling sensor 104 to insulation element 106 such that sensor 104 detects displacement of insulation element 106. Movable arm 140 is configured such that movable arm 140 is displaced when insulation element 106 moves. In particular, movable arm 140 of sensor 104 contacts expansion plate 130 coupled to insulation element 106. In some embodiments, sensor 104 is coupled to support member 148 adjacent lower portion 116 of insulation shell 108.

The systems and methods described above provide a sensor to detect displacement of a movable contact of an embedded pole. In some embodiments, the sensor directly measures displacement of an insulation element coupled to the movable contact. As a result, the sensor provides real time monitoring of operation of the embedded pole. For example, the sensor is used to determine characteristics such as the distance between the movable contact and a fixed contact, the opening speed of the embedded pole, the closing speed of the embedded pole, and the degree of wear of the contacts. Further, in some embodiments, the sensor is used to measure characteristics of contacts that are enclosed in a vacuum interrupter of the embedded pole.

An exemplary technical effect of the methods, systems, and apparatus described herein includes at least one of: (a) providing real time monitoring of embedded poles; (b) increasing the lifecycle of embedded poles; (c) reducing cost to maintain embedded poles; (d) providing indications of wearing of contacts; and (e) increasing reliability of embedded poles.

Exemplary embodiments of systems and methods for embedded poles are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

Although exemplary embodiments have been described above with a certain degree of particularity, those skilled in the art could make numerous alterations to the disclosed embodiments without departing from the spirit or scope of this disclosure. All directional references (e.g., upper, lower, upward, downward, left, right, leftward, rightward, top, bottom, above, below, vertical, horizontal, clockwise, and counterclockwise) are only used for identification purposes to aid the reader's understanding of the disclosure, and do not create limitations, particularly as to the position, orientation, or use of the disclosure. Joinder references (e.g., attached, coupled, coupled, and the like) are to be construed broadly and may include intermediate members between a connection of elements and relative movement between elements. As such, joinder references do not necessarily infer that two elements are directly coupled and in fixed relation to each other. It is intended that all matter contained in the above description or shown in the accompanying drawings shall be interpreted as illustrative only and not limiting.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An embedded pole comprising:
a conductive path;
a movable contact selectively movable between a first position in which said conductive path is closed and a second position in which said conductive path is open;
an insulation element coupled to and selectively movable in conjunction with said movable contact;
an expansion plate coupled to said insulation element, said expansion plate movable with the selective movement of said insulation element; and
a sensor coupled to said expansion plate and operable to detect a displacement of said expansion plate that corresponds to a movement of said insulation element and said movable contact between the first position and the second position.

2. An embedded pole in accordance with claim 1, further comprising a support member supporting said sensor.

3. An embedded pole in accordance with claim 1, wherein said sensor comprises a body and a movable arm coupled to said body, said movable arm movable relative to said body and biased towards said expansion plate.

4. An embedded pole in accordance with claim 1, wherein said insulation element extends through an opening in said expansion plate.

5. An embedded pole in accordance with claim 1, wherein said conductive path comprises an upper terminal, a lower terminal, and a vacuum interrupter, said vacuum interrupter comprising a first end and a second end opposite said first end, said upper terminal coupled to said first end and said lower terminal coupled to said second end.

6. An embedded pole in accordance with claim 5, further comprising an insulation shell comprising an upper portion and a lower portion, said upper terminal housed within said upper portion and said lower terminal housed within said lower portion, said sensor disposed adjacent said lower portion.

7. An embedded pole in accordance with claim 1, further comprising a fixed contact and a processor coupled to said sensor, said processor determining, based on the sensed displacement of said movable contact, at least one of the following characteristics: distance between said movable contact and said fixed contact when said movable contact is in the second position, speed of said movable contact as said movable contact moves from the first position to the second position, speed of said movable contact as said movable contact moves from the second position to the first position, and degree of wear of said movable contact and said fixed contact.

8. An embedded pole in accordance with claim 1, wherein said movable contact, said insulation element, and said expansion plate move in a linear direction, said sensor detecting displacement of said insulation element in the linear direction.

9. An embedded pole in accordance with claim 8, wherein a movable arm of said sensor moves in the linear direction.

10. A method of assembling an embedded pole, said method comprising:
coupling a movable contact to a conductive path that includes an upper terminal and a lower terminal, the movable contact selectively movable between a first position in which the conductive path is closed and a second position in which the conductive path is open;
housing at least a portion of the conductive path in an insulation shell, the upper terminal disposed in an upper portion of the insulation shell and the lower terminal disposed in a lower portion of the insulation shell;
coupling an insulation element to the movable contact, the insulation element moving in conjunction with the movable contact;
coupling an expansion plate to the insulation element; and
coupling, a sensor to the expansion plate, the sensor detecting displacement of the expansion plate.

11. A method in accordance with claim 10, wherein the sensor includes a body and a movable arm, and wherein coupling the sensor to the expansion plate comprises coupling the movable arm to the expansion plate, the expansion plate causing displacement of the movable arm when the expansion plate moves.

12. A method in accordance with claim 10, further comprising coupling the sensor to a support member adjacent the lower portion of the insulation shell.

* * * * *